United States Patent
Lyon

(10) Patent No.: US 9,197,667 B2
(45) Date of Patent: Nov. 24, 2015

(54) IP REFLECTION

(71) Applicant: F5 Networks, Inc., Seattle, WA (US)

(72) Inventor: Barrett Gibson Lyon, Pacifica, CA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 14/189,971

(22) Filed: Feb. 25, 2014

(65) Prior Publication Data

US 2014/0245421 A1     Aug. 28, 2014

Related U.S. Application Data

(60) Provisional application No. 61/768,946, filed on Feb. 25, 2013.

(51) Int. Cl.
*H04L 29/06* (2006.01)
*H04L 29/12* (2006.01)

(52) U.S. Cl.
CPC ........ *H04L 63/1458* (2013.01); *H04L 61/2514* (2013.01); *H04L 61/2539* (2013.01); *H04L 61/2557* (2013.01)

(58) Field of Classification Search
CPC ............ H04L 63/1458; H04L 61/2514; H04L 61/2539; H04L 61/2557
USPC .......................................................... 726/11
See application file for complete search history.

(56) References Cited

U.S. PATENT DOCUMENTS

| | | |
|---|---|---|
| 5,898,876 A | 4/1999 | James |
| 6,249,801 B1 | 6/2001 | Zisapel et al. |
| 6,434,618 B1 | 8/2002 | Cohen et al. |
| 2004/0190522 A1 | 9/2004 | Aerrabotu et al. |
| 2004/0225713 A1* | 11/2004 | Abbasi et al. ................. 709/203 |
| 2005/0129001 A1 | 6/2005 | Backman et al. |
| 2006/0002405 A1 | 1/2006 | Le Sauze et al. |
| 2008/0028456 A1* | 1/2008 | O'Rourke et al. ............... 726/11 |
| 2008/0209053 A1* | 8/2008 | Shen et al. .................... 709/228 |
| 2009/0040926 A1* | 2/2009 | Li et al. ..................... 370/230.1 |
| 2011/0141900 A1* | 6/2011 | Jayawardena et al. ........ 370/237 |
| 2012/0210416 A1 | 8/2012 | Mihelich et al. |
| 2013/0044757 A1 | 2/2013 | Rai et al. |

OTHER PUBLICATIONS

International Search Report for International Patent Application No. PCT/US2014/018431 (Jul. 9, 2014).

\* cited by examiner

*Primary Examiner* — Michael S McNally
(74) *Attorney, Agent, or Firm* — LeClairRyan, a Professional Corporation

(57) ABSTRACT

IP reflection comprising double static NAT (network address translation) is disclosed. In some embodiments, a packet having a public IP address is received at a protecting network. The public IP address of the packet is translated to a corresponding protected IP address associated with a protected network, and the packet is forwarded to the protected network for servicing. The protected IP address of a response to the packet from the protected network is translated back to the public IP address at the protected network before sending.

24 Claims, 5 Drawing Sheets

IP REFLECTION

CROSS REFERENCE TO OTHER APPLICATIONS

This application claims priority to U.S. Provisional Patent Application No. 61/768,946 entitled IP REFLECTION filed Feb. 25, 2013 which is incorporated herein by reference for all purposes.

BACKGROUND OF THE INVENTION

DDoS (distributed denial of service) attacks remain a prevalent network security issue. Improved techniques for detecting and stopping such attacks are useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Techniques for scrubbing network traffic are disclosed in detail herein. In some cases, the described network traffic scrubbing service is facilitated by a third party provider on behalf of one or more customers (e.g., enterprises) that employ the third party provider to filter traffic such that malicious traffic is blocked or removed and only clean traffic is allowed. In some embodiments, the network traffic scrubbing service uses IP (Internet Protocol) reflection to appropriately route clean traffic. IP reflection comprises a new routing technology used to route traffic from one location to another without a backbone, tunnel, or direct network connection while at the same time not encapsulating it. This technology used in conjunction with anycast provides a clean routing platform for service based DDoS defense and solves many problems with existing DDoS defense services.

Figure 1:
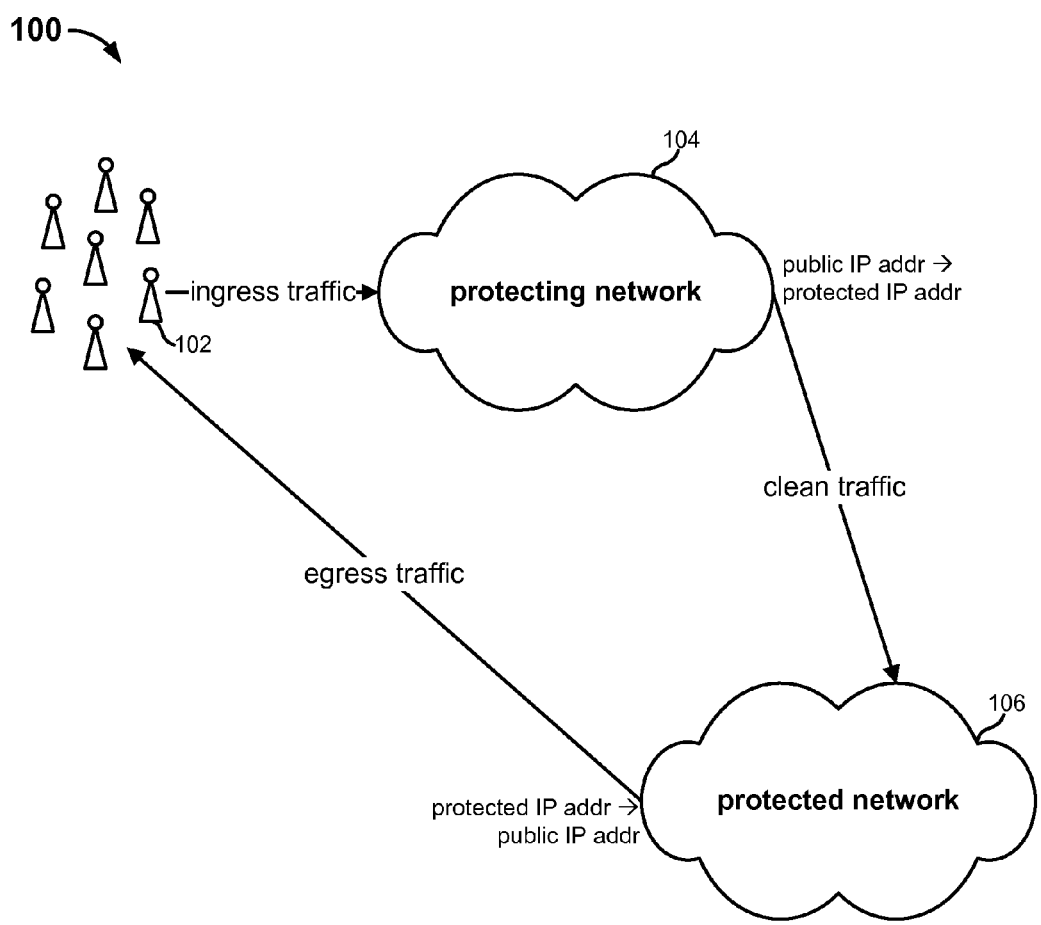
FIG. 1 is a high level block diagram illustrating an embodiment of a network environment in which network traffic is scrubbed and filtered and appropriately routed via IP reflection.

FIG. 1 is a high level block diagram illustrating an embodiment of a network environment in which network traffic is scrubbed and filtered and appropriately routed via IP reflection. Although not explicitly depicted, the various components comprising network environment 100 or parts thereof may communicate via a network such as the Internet. As depicted, ingress traffic from one or more clients 102 is received by protecting network 104, and only clean traffic is routed by protecting network 104 to protected network 106 for servicing. Egress traffic in response to clean ingress traffic is routed by protected network 106 directly to the requesting clients 102. Clean ingress traffic and corresponding egress traffic are appropriately routed using IP reflection. In the given example, IP reflection comprises double static NAT (network address translation). That is, protecting network 104 translates a public IP address of a clean packet into a corresponding private IP address to appropriately route the packet to protected network 106, and protected network 106 thereafter translates the private IP address of a response packet into the corresponding public IP address. Thus, the communications comprising a request from and a response to a legitimate client 102 appear uninterrupted to that client.

In some embodiments, an entity that subscribes to a traffic scrubbing service as described with respect to network environment 100 has a network (e.g., Internet) connection configured using BGP (Border Gateway Protocol) with the ability to announce a single network prefix of a /24 or larger. The third party traffic scrubbing service may provide the network addresses required for routing via IP reflection. In some embodiments, the services provided by the entity (e.g., www, mail, etc.) are announced via public prefixes which route to protecting network 104. Protecting network 104, for example, may comprise a non-backbone connected anycast cloud of one or more scrubbing centers associated with the third party traffic scrubbing service. Thus, when an entity is "on boarded" to protecting network 104, the /24 of the entity that is put under protection is announced to the peers and networks at each scrubbing center location comprising protecting network 104.

As depicted, all ingress traffic is first received by protecting network 104. After ingress traffic has been scrubbed and deemed safe, the traffic is routed to an appropriate destination (e.g., a server or server farm) on protected network 106 of the entity using IP reflection. A public destination IP address accessible via protecting network 104 corresponds to a private (i.e., hidden or protected) destination IP address (or prefix of a /32 or larger) on protected network 106. The private prefix is used to return or respond to the traffic from the public prefix. The mapping relationship between the public and private IP addresses is used to appropriately forward packets from protecting network 104 to protected network 106. In some embodiments, a 1:1 ratio of prefixes that are active are employed. As an example, the entity may use 1.1.1.0/24 as its public prefix with services sitting on 1.1.1.1 and 1.1.1.2. In this case, two /32 prefixes also exist on the protected side to receive the 1.1.1.1 and 1.1.1.2 traffic. In this example, for instance, 1.1.1.1 may forward to 2.2.2.1 and 1.1.1.2 to 2.2.2.2. The private prefix does not need to be contiguous nor does it need to match the last octet in the public prefix, but in some embodiments it should be uniquely assigned to a single /32 and not be a part of the public prefix.

Protecting network 104 and protected network 106 further comprise IP reflection routers. Such IP reflection routers are configured to perform network address translations between corresponding public and private IP addresses. Specifically, an IP reflection router on the protecting network 104 side is configured to change the destination IP address of a packet from the public IP address to the appropriately mapped private IP address. For example, if the public prefix is 1.1.1.1/32 and the private prefix is 1.1.2.1/32, the destination IP address is re-written as 1.1.2.1/32, and the packet is forwarded back to the Internet for routing to protected network 106. This routing can be greatly accelerated by a private peering connection between the protecting 104 and protected 106 networks. In a similar manner, an IP reflection router on the protected network 106 side converts traffic from the private prefix back to the public prefix. An IP reflection router moreover rewrites the checksum of a header during network address translation. IP address mapping tables are distributed to and maintained by the IP reflection routers on protecting network 104 and protected network 106 and are the same on both sides. In some embodiments, a simple non-stateful mapping exists between a prescribed public IP address and a corresponding private IP address. In other embodiments, more complex IP address and port relationships are facilitated via dynamically updatable mapping tables.

Figure 2:
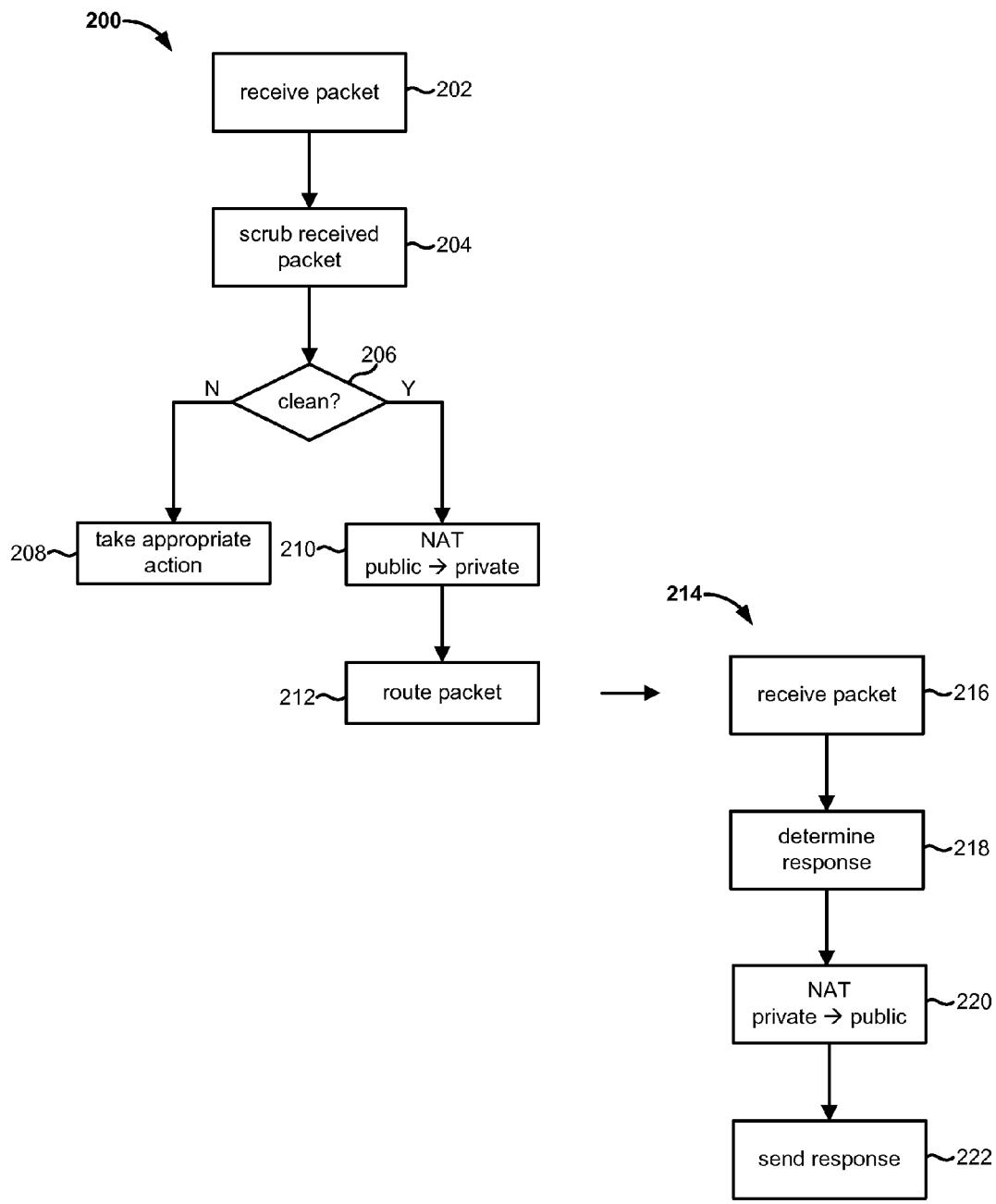
FIG. 2 comprises flow charts illustrating embodiments of processes for servicing a client request.

FIG. 2 comprises flow charts illustrating embodiments of processes for servicing a client request. For example, process 200 may be employed by one or more nodes of protecting network 104 while process 214 may be employed by one or more nodes of protected network 106. Process 200 starts at step 202 at which a packet is received, e.g., from a client 102. At step 204, the received packet is scrubbed, e.g., at a scrubbing site. At step 206, it is determined whether the received packet is clean. If it is determined at step 206 that the received packed is not clean, appropriate action is taken at step 208, e.g., to prevent or at least mitigate a potential attack. For example, the packet may be dropped at step 208. If it is determined at step 206 that the received packed is clean, a public to private network address translation is performed at step 210 to translate the destination IP address. At step 212, the packet is rerouted. The packet rerouted at step 212 of process 200 is received at a destination corresponding to the translated network address at step 216 of process 214. At step 218, a response to the received packet is determined, e.g., by a server. A private to public network address translation is performed at step 220 to translate the source IP address of the response packet. At step 222, the response is sent to the client from which the request of step 202 is received. In some embodiments, the network address translations of step 210 of process 200 and step 220 of process 214 are performed by IP reflection routers.

Given that the communication flow through an IP reflection router is asynchronous, keeping state on traffic flow is a little more difficult than if it were synchronous. Despite only half of the traffic of a communication flow passing through, a full state table may be deduced, for example, on the protecting network 104 side based on the ingress traffic. Such a state table may be used, for instance, to prevent or reduce basic DDoS attacks. Four types of connection flows exist: client-to-server, server-to-client, out-of-state, and mid-flow. Non-state related attacks happen in the out-of-state or mid-flow areas. Thus, extra care must be exercised when accepting these types of flows. Client-to-server flows are monitored in a variety of ways to ensure that connections are appropriately established and broken and to catch high bandwidth related flows and connection floods.

Figure 3:
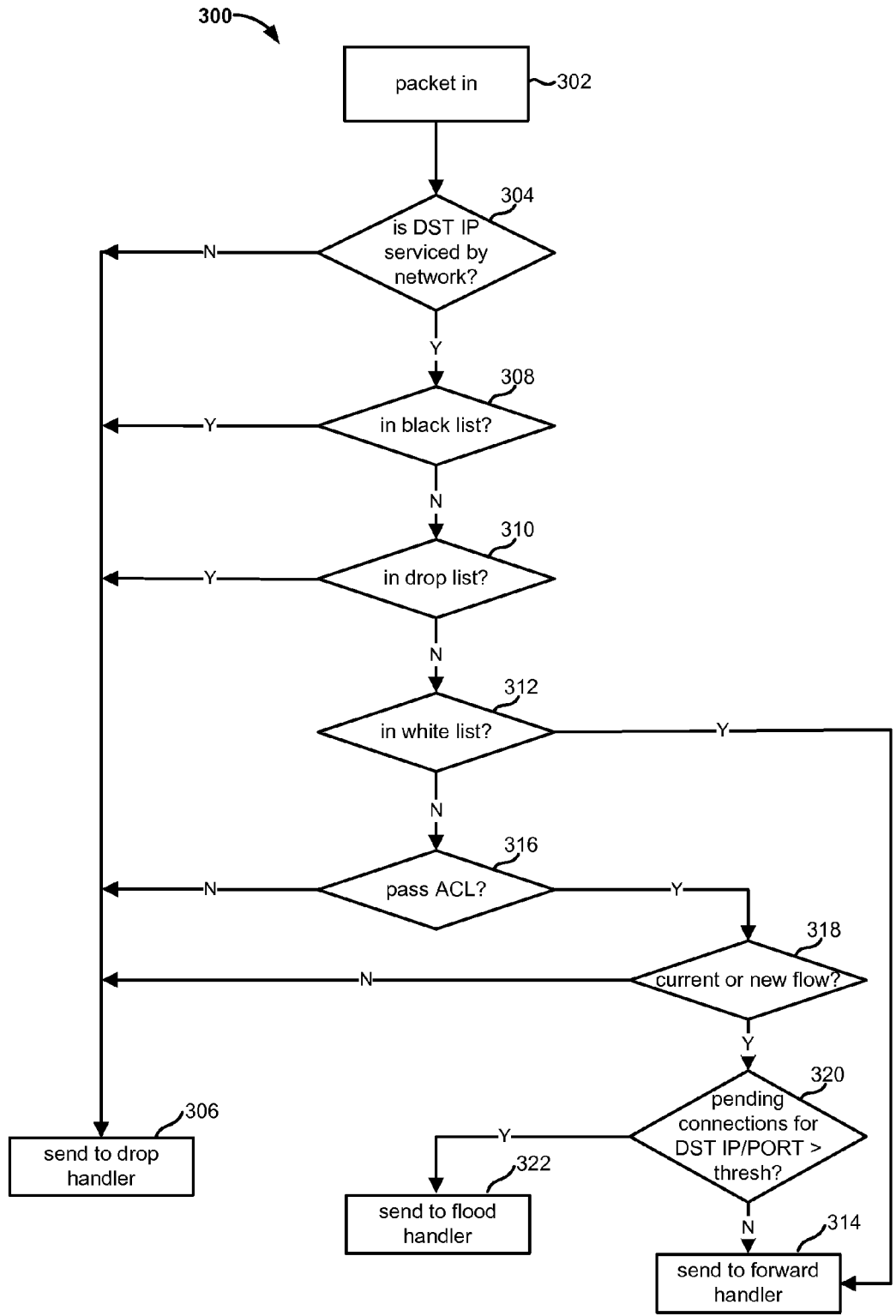
FIG. 3 is a flow chart illustrating an embodiment of a process for handling an ingress packet.

FIG. 3 is a flow chart illustrating an embodiment of a process for handling an ingress packet. For example, process 300 may comprise corresponding steps of process 200 of FIG. 2. In some embodiments, process 300 is employed by a scrubbing node of protecting network 104 of FIG. 1. Process 300 starts at step 302 at which an ingress packet is received. At step 304, it is determined whether the destination IP address of the packet is serviced by the network. If not, the packet is sent to a drop handler configured to drop the packet at step 306. At step 308, it is determined whether the packet is from a blacklisted source. If so, the packet is sent to the drop handler at step 306. At step 310, it is determined whether the packet is from a source included in a drop list. If so, the packet is sent to the drop handler at step 306. At step 312, it is determined whether the packet is from a whitelisted source. If so, the packet is sent to a forward handler at step 314 that is configured to forward the packet to an appropriate node for servicing. At step 316, it is determined whether an ACL (access control list) is passed. If not, the packet is sent to the drop handler at step 306. At step 318, it is determined whether the packet is part of a current or new flow. If not, the packet is sent to the drop handler at step 306. At step 320, it is determined whether pending connections to the destination IP address/port are greater than a threshold. If so, the packet is sent to a flood handler at step 322. If not, the packet is sent to the forward handler at step 314.

Figure 4A:
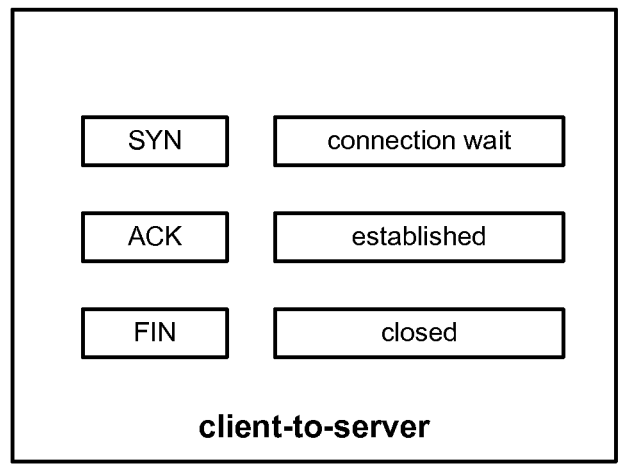
FIGS. 4A and 4B are tables illustrating embodiments of client-to-server and server-to-client communications, respectively.
Figure 4B:
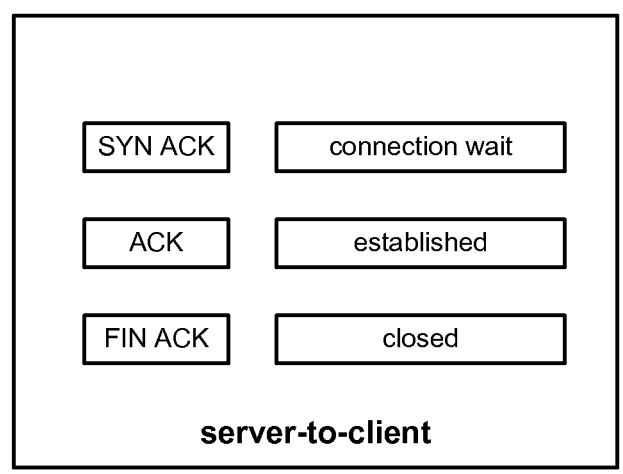

FIGS. 4A and 4B are tables illustrating embodiments of client-to-server and server-to-client communications, respectively. The given tables are rudimentary examples of how hints from the ingress traffic flow (e.g., client-to-server communications) may be used to create state without seeing the entire symmetrical flow of the traffic. Many other types of packets exist, but the general concept is to similarly use hints from the seen traffic to create (TCP) state tables. In some embodiments, packet dropping and forwarding involves counters. Seeing what each flow is doing helps to properly classify traffic as good or bad.

Figure 5:
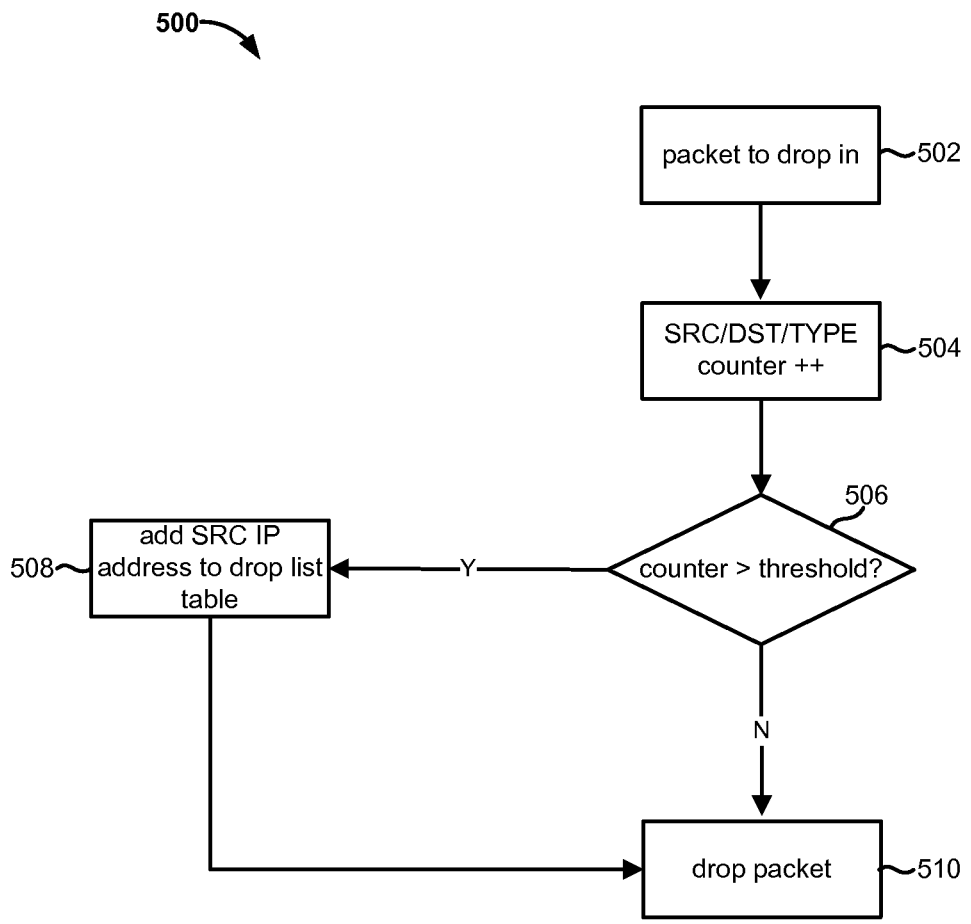
FIG. 5 is a flow chart illustrating an embodiment of a process associated with a drop handler.

FIG. 5 is a flow chart illustrating an embodiment of a process associated with a drop handler. Process 500 starts at 502 at which a packet to drop is received. At step 504, an associated counter is incremented. At step 506, it is determined whether the counter exceeds a threshold. If so, the source IP address is added to a drop list table at step 508. The received packet is dropped at step 510. Process 500 provides one example of populating a drop list. A drop list may be implemented in any other appropriate manner. For example, in some embodiments, a drop list table comprises a fast drop list of bad IP addresses that expire after a prescribed time duration (e.g., 300 seconds). In such cases, an associated (e.g., 300 second) counter is updated when an IP address is re-added to the drop list.

The drop and/or flood tables may need to be synchronized between locations. In some embodiments, the ability to flush and/or update these tables, e.g., from stdin (standard input), is provided. On detecting a large attack, for example, providing the ability to push known bad addresses into each scrubbing center is very helpful. In some embodiments, a multicast style method to update these tables is provided. In some such cases, they are broadcasted to their local network, e.g., via UDP (User Datagram Protocol), so that each machine can keep these tables in sync at a local PoP (point of presence). Keeping them in sync locally helps the machines deal with traffic flows when load balancing of the traffic changes during an attack.

In a network environment employing IP reflection, mapping configuration may be achieved in any appropriate manner. For example, in a flat file, the formatting may comprise: /usr/local/etc/reflection-mapping.conf Public Prefix→Private Prefix→Customer ID Examples of such a mapping format scheme include: 1.1.1.1/32→1.1.2.1/32→BANK_X and 8.8.8.0/24→9.9.9.0/24→ENTITY_X. In many cases, including a customer identifier is useful to prevent future confusion. For example, the customer identifier may be used to help resolve state table information (e.g., who is under attack, which traffic belongs to whom, etc.). Furthermore, a mapping table may be updated in any appropriate manner. Similar to pfctl, a mapping table may be refreshed without harming any existing connections. New updates may be added to the system. Conflicts result in the entire pre-existing conflict to receive a RST to reset each connection so they conform with the new configuration.

In a basic version of IP reflection, a simple table may be queried with a tool that can be displayed in an easy to read format such as: Customer ID:Mapping:Gauge 64:PPS. The following is an example of such a format: BANK_X:1.1.1.1/32→1.1.2.1/32:1000000000000000000:250. As the state table becomes more complex, several different tables to query may exist including a drop table, a flood table, and/or a forward table (i.e., actual connection state table). Thus query tools are needed to inspect each table on its own and query against the table so that customer specific statistics and flow information may be built for a customer dashboard. This also helps in debugging attacks and seeing what traffic is doing globally on the network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, by a network traffic management computing device, a packet having a public IP address at a protecting network comprising a plurality of scrubbing nodes to filter received traffic;
translating, by the network traffic management computing device, the public IP address of the packet to a corresponding protected IP address associated with a protected network; and
forwarding, by the network traffic management computing device, the packet to the protected network for servicing, wherein the protected IP address of a response to the received packet from the protected network is translated back to the public IP address at the protected network before sending.

2. The method of claim 1, wherein the packet is received at a scrubbing node of the protecting network.

3. The method of claim 1, further comprising:
determining, by the network traffic management computing device, that the packet received at the protecting network comprises clean or legitimate traffic;
maintaining, by the network traffic management computing device, a mapping between the public IP address and the protected IP address at both the protecting network and the protected network, wherein a non-stateful, one-to-one mapping exists between the public IP address and the protected IP address and a mapping between the public IP address and the protected IP address is facilitated via dynamically updated mapping tables; and
determining, by the network traffic management computing device, a communication flow state table based on ingress traffic seen at the protecting network.

4. The method of claim 1, wherein the protecting network is associated with a third party network traffic scrubbing service.

5. The method of claim 4, wherein:
the third party network traffic scrubbing service comprises a non-backbone connected any cast cloud of the plurality of scrubbing nodes for filtering received traffic; and
the third party network traffic scrubbing service forwards clean traffic to the protected network for servicing.

6. The method of claim 1, wherein:
an IP reflection router of the protecting network is configured to translate the public IP address of the packet to the corresponding protected IP address; and
the IP reflection router of the protected network is configured to translate the protected IP address of the response to the corresponding public IP address.

7. The method of claim 1, wherein:
the protected network comprises an enterprise network;
the public IP address and the corresponding protected IP address of the received packet comprise destination IP addresses;
the protected IP address and the corresponding public IP address of the response to the packet comprise source IP addresses; and
the protecting network is configured to receive ingress traffic of the protected network.

8. The method of claim 1, wherein the protecting network provides defense against DDoS (distributed denial of service) attacks.

9. A non-transitory computer readable medium having stored thereon instructions for preventing distributed denial of service attack comprising machine executable code which when executed by at least one processor, causes the processor to perform steps comprising:
receiving a packet having a public IP address at a protecting network, wherein the protecting network comprising a plurality of scrubbing nodes to filter received traffic;
translating the public IP address of the packet to a corresponding protected IP address associated with a protected network; and
forwarding the packet to the protected network for servicing, wherein the protected IP address of a response to the received packet from the protected network is translated back to the public IP address at the protected network before sending.

10. The medium as set forth in claim 9 wherein the packet is received at a scrubbing node of the protecting network.

11. The medium as set forth in claim 9 further comprising:
determining that the packet received at the protecting network comprises clean or legitimate traffic;
maintaining a mapping between the public IP address and the protected IP address at both the protecting network and the protected network, wherein a non-stateful, one-to-one mapping exists between the public IP address and the protected IP address and a mapping between the public IP address and the protected IP address is facilitated via dynamically updated mapping tables; and determining, by the network traffic management computing device, a communication flow state table based on ingress traffic seen at the protecting network.

12. The medium as set forth in claim 9 wherein the protecting network is associated with a third party network traffic scrubbing service.

13. The medium as set forth in claim 12 wherein:
the third party network traffic scrubbing service comprises a non-backbone connected any cast cloud of the plurality of scrubbing nodes for filtering received traffic; and
the third party network traffic scrubbing service forwards clean traffic to the protected network for servicing.

14. The medium as set forth in claim 9 wherein:
an IP reflection router of the protecting network is configured to translate the public IP address of the packet to the corresponding protected IP address; and
the IP reflection router of the protected network is configured to translate the protected IP address of the response to the corresponding public IP address.

15. The medium as set forth in claim 9 wherein:
the protected network comprises an enterprise network;
the public IP address and the corresponding protected IP address of the received packet comprise destination IP addresses;
the protected IP address and the corresponding public IP address of the response to the packet comprise source IP addresses; and
the protecting network is configured to receive ingress traffic of the protected network.

16. The medium as set forth in claim 9 wherein the protecting network provides defense against DDoS (distributed denial of service) attacks.

17. A network traffic management computing device comprising:
at least one of configurable hardware logic configured to be capable of implementing or a processor coupled to a memory and configured to execute programmed instructions stored in the memory comprising:
receiving a packet having a public IP address at a protecting network, wherein the protecting network comprising a plurality of scrubbing nodes to filter received traffic;
translating the public IP address of the packet to a corresponding protected IP address associated with a protected network; and
forwarding the packet to the protected network for servicing, wherein the protected IP address of a response to the received packet from the protected network is translated back to the public IP address at the protected network before sending.

18. The device as set forth in claim 17 wherein the packet is received at a scrubbing node of the protecting network.

19. The device as set forth in claim 17 wherein the at least one of the configurable logic is further configured to implement or the processor is further configured to execute programmed instructions stored in the memory further comprising:
determining that the packet received at the protecting network comprises clean or legitimate traffic;
maintaining a mapping between the public IP address and the protected IP address at both the protecting network and the protected network, wherein a non-stateful, one-to-one mapping exists between the public IP address and the protected IP address and a mapping between the public IP address and the protected IP address is facilitated via dynamically updated mapping tables; and
determining, by the network traffic management computing device, a communication flow state table based on ingress traffic seen at the protecting network.

20. The device as set forth in claim 17 wherein the protecting network is associated with a third party network traffic scrubbing service.

21. The device as set forth in claim 20 wherein:
the third party network traffic scrubbing service comprises a non-backbone connected any cast cloud of the plurality of scrubbing nodes for filtering received traffic; and
the third party network traffic scrubbing service forwards clean traffic to the protected network for servicing.

22. The device as set forth in claim 17 wherein:
an IP reflection router of the protecting network is configured to translate the public IP address of the packet to the corresponding protected IP address; and
the IP reflection router of the protected network is configured to translate the protected IP address of the response to the corresponding public IP address.

23. The device as set forth in claim 17 wherein:
the protected network comprises an enterprise network;
the public IP address and the corresponding protected IP address of the received packet comprise destination IP addresses;
the protected IP address and the corresponding public IP address of the response to the packet comprise source IP addresses; and
the protecting network is configured to receive ingress traffic of the protected network.

24. The device as set forth in claim 17 wherein the protecting network provides defense against DDoS (distributed denial of service) attacks.

* * * * *